United States Patent
Liu et al.

(10) Patent No.: US 12,199,274 B2
(45) Date of Patent: Jan. 14, 2025

(54) SECONDARY BATTERY AND POWER CONSUMPTION APPARATUS INCLUDING THE SAME PRELIMINARY CLASS

(71) Applicant: CONTEMPORARY AMPEREX TECHNOLOGY (HONG KONG) LIMITED, Hong Kong (CN)

(72) Inventors: Liangbin Liu, Ningde (CN); Jiazheng Wang, Ningde (CN); Zijian Lv, Ningde (CN); Qingwei Yan, Ningde (CN); Binyi Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/059,431

(22) Filed: Nov. 29, 2022

(65) Prior Publication Data

US 2023/0207786 A1 Jun. 29, 2023

Related U.S. Application Data

(63) Continuation of application No. PCT/CN2021/141689, filed on Dec. 27, 2021.

(51) Int. Cl.
*H01M 4/134* (2010.01)
*H01M 4/1395* (2010.01)
(Continued)

(52) U.S. Cl.
CPC ........... *H01M 4/366* (2013.01); *H01M 4/134* (2013.01); *H01M 10/0468* (2013.01); *H01M 2004/027* (2013.01)

(58) Field of Classification Search
None
See application file for complete search history.

(56) References Cited

U.S. PATENT DOCUMENTS

2016/0329557 A1* 11/2016 Sugimori ............. H01M 4/483
2016/0351892 A1* 12/2016 Sugimori ............. H01M 4/483
(Continued)

FOREIGN PATENT DOCUMENTS

CN     101894940     * 11/2010     ........... H01M 4/134
CN     101894940 A     11/2010
(Continued)

OTHER PUBLICATIONS

English translation of CN 101894940 (Year: 2010).*
(Continued)

*Primary Examiner* — Yoshitoshi Takeuchi
(74) *Attorney, Agent, or Firm* — Kilpatrick Townsend & Stockton LLP

(57) ABSTRACT

The present disclosure provides a secondary battery including a negative electrode sheet. The negative electrode sheet includes: a negative electrode current collector; a first negative film layer provided on at least one surface of the negative electrode current collector; and a second negative film layer provided on a surface of the first negative film layer. The first negative film layer includes a first negative active material and a first conductive agent, and the first negative active material includes a silicon-based material. A mass proportion of the silicon-based material in the first negative film layer is greater than or equal to 30%, and a mass proportion of the first conductive agent in the first negative film layer is greater than or equal to 25%. The secondary battery of the present disclosure does not easily expand and has good cycle performance.

13 Claims, 4 Drawing Sheets

(51) Int. Cl.
  *H01M 4/36* (2006.01)
  *H01M 10/04* (2006.01)
  *H01M 4/02* (2006.01)

(56) References Cited

U.S. PATENT DOCUMENTS

2021/0391572 A1* 12/2021 Zeng .................. H01M 10/054
2022/0052320 A1  2/2022 Chen et al.
2022/0102708 A1  3/2022 Wang et al.

FOREIGN PATENT DOCUMENTS

| CN | 105742613 | * | 7/2016 | ........ H01M 10/0525 |
| CN | 106252659 A | | 12/2016 | |
| CN | 111640913 A | | 9/2020 | |
| EP | 3968407 A1 | | 3/2022 | |
| WO | 2020186799 A1 | | 9/2020 | |
| WO | WO-2020177624 A1 | * | 9/2020 | ........ H01M 10/0525 |
| WO | 2021217639 A1 | | 11/2021 | |

OTHER PUBLICATIONS

English translation of CN 105742613 (Year: 2016).*
International Search Report and Written Opinion received in corresponding International Application PCT/CN2021/141689, mailed May 6, 2022.
The extended European search report received in corresponding European Application 21942137.7, mailed Aug. 14, 2023.

* cited by examiner

SECONDARY BATTERY AND POWER CONSUMPTION APPARATUS INCLUDING THE SAME PRELIMINARY CLASS

CROSS-REFERENCE TO RELATED APPLICATIONS

The present application is a continuation of International Application PCT/CN2021/141689, filed Dec. 27, 2021 and entitled "SECONDARY BATTERY AND POWER CONSUMPTION APPARATUS INCLUDING THE SAME", the entire content of which is incorporated herein by its reference.

TECHNICAL FIELD

The present application relates to the field of battery technologies, and in particular, to a secondary battery and a power consumption apparatus including the same.

BACKGROUND

In recent years, secondary batteries are widely applied to energy storage power systems, such as hydraulic power, thermal power, wind power and solar power plants, as well as many fields, such as electric tools, electric bicycles, electric motorcycles, electric vehicles, military equipment and aerospace. Due to the great development of the secondary batteries, higher requirements are put forward for their energy density, electrochemical performance and the like.

Therefore, how to make a battery take into account better cycle performance under the premise of higher energy density, is still an urgent problem to be solved in the art.

SUMMARY

The present application is made in view of the foregoing problem, and the objective is to provide a secondary battery, so that the secondary battery can take into account better cycle performance under the premise of higher energy density.

In order to achieve the foregoing objective, the present application provides a secondary battery and a power consumption apparatus including the same.

In a first aspect of the present application, a secondary battery is provided, including a negative electrode sheet, the negative electrode sheet including:
  a negative electrode current collector;
  a first negative film layer provided on at least one surface of the negative electrode current collector; and
  a second negative film layer provided on a surface of the first negative film layer;
  where the first negative film layer includes a first negative active material and a first conductive agent, and the first negative active material includes a silicon-based material; and
  a mass proportion of the silicon-based material in the first negative film layer is greater than or equal to 30%, and a mass proportion of the first conductive agent in the first negative film layer is greater than or equal to 25%.

The secondary battery of the present application can take into account good cycle performance under the premise of higher energy density.

In any implementation manner, the mass proportion of the silicon-based material in the first negative film layer may be 30%-60%; optionally, 40%-50%. When a content of the silicon-based material is within the foregoing range, the secondary battery to which the negative electrode sheet of the present application is applied has higher energy density.

In any implementation manner, the mass proportion of the first conductive agent in the first negative film layer may be 25%-40%; optionally, 28%-35%. By using the first conductive agent whose content is within the foregoing range, the cycle performance of the battery can be further improved.

In any implementation manner, the first conductive agent includes one or more of superconducting carbon, acetylene black, Ketjen black, conductive carbon black, graphene, carbon dots, carbon nanotubes, carbon nanofibers and graphite; or optionally, the first conductive agent includes one or more of conductive carbon black, graphite and carbon nanotubes.

In any implementation manner, the first conductive agent includes conductive carbon black, and a mass proportion of the conductive carbon black in the first negative film layer is greater than or equal to 20%; for example, it may be 20%-40%, or 23%-35%.

In any implementation manner, the first conductive agent includes carbon nanotubes, and a mass proportion of the carbon nanotubes in the first negative film layer is less than or equal to 0.4%; for example, 0.1%-0.3%.

In any implementation manner, the first conductive agent includes graphite, and a volume average particle diameter Dv50 of the graphite is less than or equal to 8 µm; optionally, 2 µm-5 µm. When the first conductive agent includes graphite whose particle diameter is within a specific range, the cycle performance of the battery can be further improved.

In any implementation manner, the first conductive agent includes graphite, and a mass proportion of the graphite in the first conductive agent is less than or equal to 10%; optionally, 3%-8%.

In any implementation manner, the first negative film layer includes a first binder, and a mass proportion of the first binder in the first negative film layer may be greater than or equal to 15%; optionally, 18%-25%.

In any implementation manner, a ratio of a thickness of the first negative film layer to a thickness of the second negative film layer is less than or equal to 1:2; optionally, 1:12-1:3.

In any implementation manner, a thickness of the first negative film layer is less than or equal to 15 µm; optionally, 5 µm-13 µm.

In any implementation manner, a ratio of surface density of the first negative film layer to surface density of the second negative film layer is less than or equal to 1:3; optionally, 1:9-1:3.

In any implementation manner, the second negative film layer includes a second negative active material, and the second negative active material includes artificial graphite; or optionally, a mass proportion of the artificial graphite in the second negative active material is greater than or equal to 80%.

In any implementation manner, a volume average particle diameter Dv50 of the artificial graphite is 10 µm-20 µm, optionally, 13 µm-18 µm.

In any implementation manner, Dn10 of the artificial graphite is 1 µm-5 µm, optionally, 2 µm-3 µm.

In any implementation manner, a specific surface area BET of the artificial graphite is 0.5 $m^2$/g-1.5 $m^2$/g, optionally, 0.6 $m^2$/g-1.0 $m^2$/g.

In any implementation manner, initial coulombic efficiency of the artificial graphite is 94.5%-96.5%, optionally, 95.0%-96.0%.

In any implementation manner, the second negative active material further includes a silicon-based material; or optionally, a mass proportion of the silicon-based material in the second negative film layer is less than or equal to 8%. By using a specific content of a silicon-based material in the second negative active material, the cycle performance of the battery can be further improved.

In a second aspect of the present application, a power consumption apparatus is further provided, including the secondary battery in the first aspect of the present application.

Figure 1:
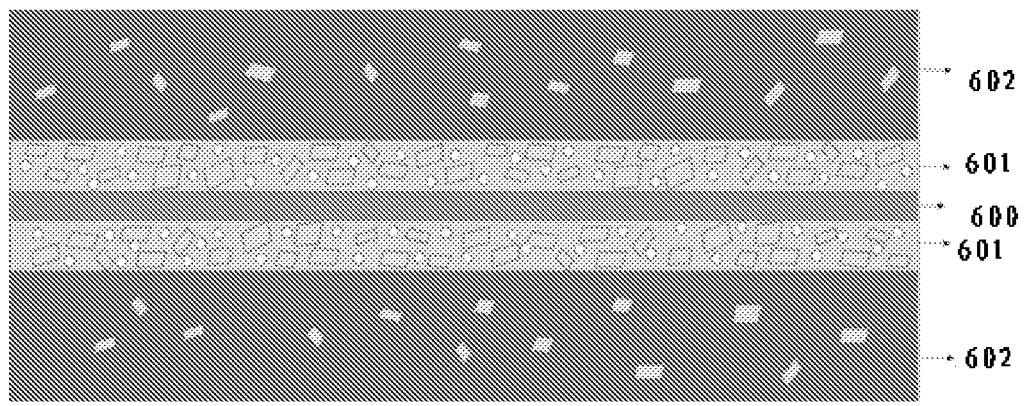
FIG. 1 is a schematic diagram of a cross section of a negative electrode sheet according to an implementation manner of the present application.
Figure 2:
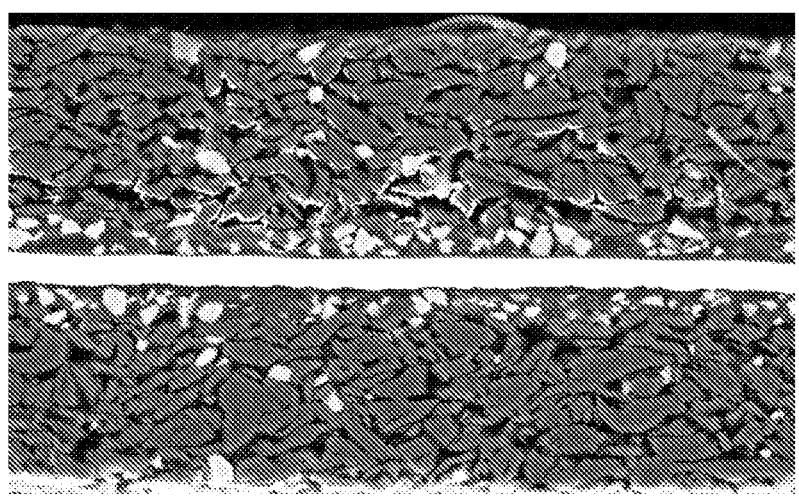
FIG. 2 is a scanning electron microscope image of a cross section of a negative electrode sheet according to an implementation manner of the present application, and brighter part in the image is a silicon-based material.
Figure 3:
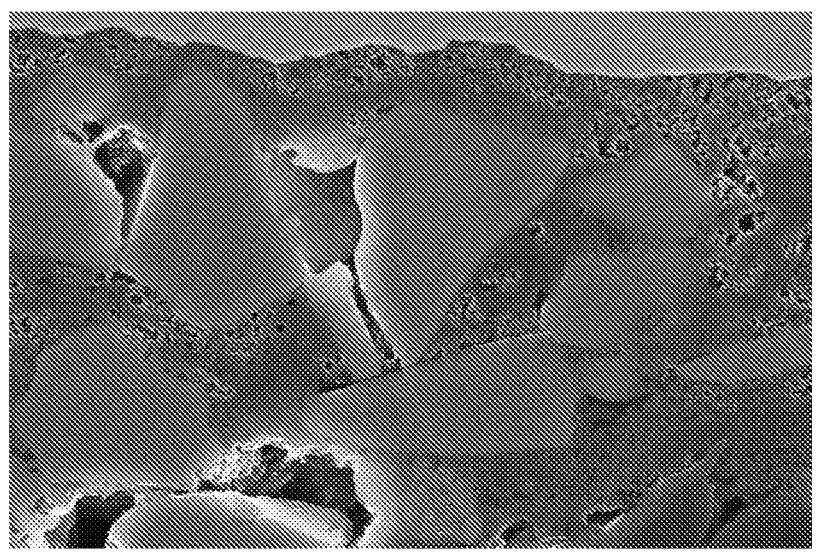
FIG. 3 is a partially enlarged image of a scanning electron microscope of FIG. 2.

DESCRIPTION OF REFERENCE SIGNS 1 battery pack; 2 upper box body; 3 lower box body; 4 battery module; 5 secondary battery; 51 housing; 52 electrode assembly; 53 cover plate; 600 current collector; 601 first negative film layer; 602 second negative film layer.

DESCRIPTION OF EMBODIMENTS

Implementation manners that specifically disclose a negative electrode sheet and a method for preparing the same, a secondary battery and a power consumption apparatus of the present application will be described below in detail with reference to the accompanying drawings as appropriate. However, unnecessarily detailed descriptions may be omitted in some cases. For example, detailed description for a well-known matter and repeated description for a practically identical structure are omitted. This is done to avoid unnecessarily redundant descriptions for ease of understanding by persons skilled in the art. In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer≥2, it is equivalent to disclosing that the parameter is, for example, an integer of 2, 3, 4, 5, 6, 7, 8, 9, 10, 11, 12, or the like.

Unless otherwise specified, all implementation manners and optional implementation manners of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

Unless otherwise specified, in the present application, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

[Secondary Battery]

In a first aspect of the present application, a secondary battery is provided, including a negative electrode sheet described below.

A secondary battery, also known as a rechargeable battery or a storage battery, refers to a battery that can activate an active material by charging after the battery is discharged and be used continuously.

Typically, a secondary battery includes a positive electrode sheet, a negative electrode sheet, a separator, and an electrolytic solution. During charging and discharging of the battery, active ions (such as lithium ions) are intercalated and deintercalated back and forth between the positive electrode sheet and the positive electrode sheet. The separator is provided between the positive electrode sheet and the negative electrode sheet, and mainly plays the role of preventing a short circuit between positive and negative electrodes while allowing the active ions to pass. The electrolytic solution plays the role of conducting the active ions between the positive electrode sheet and the negative electrode sheet.

[Negative Electrode Sheet]

An implementation manner of the present application provides a negative electrode sheet, and the negative electrode sheet includes:

a negative electrode current collector;
a first negative film layer provided on at least one surface of the negative electrode current collector; and
a second negative film layer provided on a surface of the first negative film layer;
where the first negative film layer includes a first negative active material and a first conductive agent, and the first negative active material includes a silicon-based material; and
a mass proportion of the silicon-based material in the first negative film layer is greater than or equal to 30%, and a mass proportion of the first conductive agent in the first negative film layer is greater than or equal to 25%.

Although the mechanism is not clear yet, the applicant surprisingly found: when a content of silicon in the first negative film layer is high, a high content of a conductive agent can be used to improve energy density and cycle performance of a battery to be produced.

By setting the mass proportion of the first conductive agent in the first negative film layer within a range of the present application, capacity utilization of the silicon-based material in the first negative film layer can be effectively ensured, and it is helpful to improve the cycle performance of the battery.

In some implementation manners, the negative electrode current collector may be metal foil or a composite current collector. For example, as the metal foil, copper foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver, silver alloy, or the like) on the polymer material substrate (such as a substrate of polypropylene (PP), polyethylene glycol terephthalate (PET), polybutylene terephthalate (PBT), polystyrene (PS), polyethylene (PE), or the like).

In some implementation manners, the first negative active material includes a silicon-based material, and the silicon-based material may be selected from one or more of elemental silicon, a silicon-oxygen compound (such as a silicon oxide), a silicon-carbon composite, a silicon-nitrogen composite, a silicon alloy and a prelithiation silicon-oxygen compound, optionally, one or more of elemental silicon, a silicon-carbon composite, a silicon-oxygen compound and a prelithiation silicon-oxygen compound, or optionally, one or more of a prelithiation silicon-oxygen compound, a silicon-oxygen compound and a silicon-carbon composite.

In some implementation manners, the mass proportion of the silicon-based material in the first negative film layer may be greater than or equal to 30%, optionally, 30%-60%; or further optionally 40%-50%. A content of the silicon-based material is within a given range, which can effectively reduce the probability of wrinkling of the electrode sheet under the premise of ensuring the higher energy density of the battery, and further reduce the separation of the first negative film layer from the current collector and the second negative film layer, thereby further improving the cycle performance of the battery.

In some implementation manners, the first conductive agent includes one or more of superconducting carbon, acetylene black, Ketjen black, conductive carbon black, graphene, carbon dots, carbon nanotubes, carbon nanofibers and graphite; or optionally, the first conductive agent includes one or more of conductive carbon black, graphite and carbon nanotubes.

In some implementation manners, the mass proportion of the first conductive agent in the first negative film layer is greater than or equal to 25%; for example, 26-40%, or 28%-35%. Through the research, the inventor found by accident that, when a content of the first conductive agent in the first negative film layer exceeds a certain content, a porous cushioning structure with high conductivity and high elasticity is formed in the first negative film layer, which can effectively cushion the expansion of the silicon-based material, thereby improving the cycle performance of the battery.

In the present application, a scanning electron microscope test for the negative electrode sheet may be conducted according to a method commonly used in the art. For example, the test may be conducted using a ZEISS sigma 300 scanning electron microscope, and then conducted with reference to the standard JY/T010-1996.

In some implementation manners, the first conductive agent includes conductive carbon black, and a mass proportion of the conductive carbon black in the first negative film layer is greater than or equal to 20%; for example, 20%-40%, or 23%-35%.

In some implementation manners, the first conductive agent includes carbon nanotubes, and a mass proportion of the carbon nanotubes in the first negative film layer is less than or equal to 0.4%; for example, 0.1%-0.3%.

In some implementation manners, a volume average particle diameter Dv50 of the silicon-based material is 3 μm-10 μm; optionally, 4 μm-8 μm.

In some implementation manners, the first conductive agent includes graphite. The graphite may be artificial graphite and/or natural graphite.

In some implementation manners, a volume average particle diameter Dv50 of the foregoing graphite is less than or equal to 8 μm; optionally, 2 μm-5 μm.

In some implementation manners, the first conductive agent includes artificial graphite.

In some implementation manners, a mass proportion of the foregoing graphite in the first conductive agent is less than or equal to 10%; optionally, 3%-8%.

In some implementation manners, the first negative film layer includes a first binder, and a mass proportion of the first binder in the first negative film layer is greater than or equal to 15%; optionally, 18%-25%.

In some implementation manners, the first binder may be selected from at least one of styrene-butadiene rubber (SBR), polyacrylic acid (PAA), polyacrylonitrile (PAN), polyacrylate sodium (PAAS), polyacrylamide (PAM), polyvinyl alcohol (PVA), sodium alginate (SA), polymethacrylic acid (PMAA) and carboxymethyl chitosan (CMCS), for example, it may be selected from at least one of styrene-butadiene rubber (SBR) and polyacrylic acid (PAA).

In some implementation manners, the first negative film layer optionally includes another additive, such as dispersant (for example, carboxymethyl cellulose or sodium carboxymethyl cellulose (CMC-Na)).

In the present application, it should be understood that the sum of all components (for example, the first negative active material, the first conductive agent, the first binder and optionally another additive) in the first negative film layer is 100% by mass.

In some implementation manners, a thickness of the first negative film layer is less than or equal to 15 μm; optionally, 5 μm-13 μm. Since the content of silicon in the first negative film layer is relatively high, the thickness of the first negative film layer within a given range can reduce the expansion of the first negative film layer, which reduces the risk of separation of the first negative film layer from the current collector and the second negative film layer, thereby further improving the cycle performance of the battery.

In some implementation manners, a ratio of a thickness of the first negative film layer to a thickness of the second negative film layer is less than or equal to 1:2; for example, 1:12-1:3, or 1:10-1:4. By setting the foregoing thickness, capacity utilization of the first negative film layer is ensured while side reactions between the first negative film layer and an electrolytic solution are reduced.

In some implementation manners, a ratio of surface density of the first negative film layer to surface density of the second negative film layer is less than or equal to 1:3; optionally, 1:9-1:3.

In some implementation manners, the surface density of the first negative film layer is 0.649-2.922 mg/cm$^2$; optionally, 0.974-2.597 mg/cm$^2$.

In the present application, the meaning of the surface density of the negative film layer is well-known in the art, and it can be tested using a method known in the art. For example, a single-sided coated and cold-pressed negative electrode sheet is given (if a double-sided coated negative electrode sheet is given, a negative active material layer on one side can be wiped off first), and it is punched into a small wafer with an area of S1, weighed and recorded as M1. Then, a negative active material layer of the foregoing weighed negative electrode sheet is wiped off, and a negative electrode current collector is weighed and recorded as M0. Surface density of the negative active material layer= (weight M1 of the negative electrode sheet−weight M0 of the negative electrode current collector)/S1. In order to ensure the accuracy of the test result, multiple groups (for example, 10 groups) of samples to be tested can be tested, and an average value is calculated as the test result.

In some implementation manners, the second negative film layer includes a second negative active material, and the second negative active material includes artificial graphite.

In some implementation manners, a mass proportion of the artificial graphite in the second negative film layer is greater than or equal to 80%, for example, 80%-100%, or 90%-95%.

In some implementation manners, a volume average particle diameter Dv50 of the artificial graphite is 10 μm-20 μm, optionally, 13 μm-18 μm.

In some implementation manners, Dn10 of the artificial graphite is 1 μm-5 μm, optionally, 2 μm-3 μm. If Dn10 is too small, a diffusion channel for the electrolytic solution may be blocked, which affects the capacity utilization of the first negative film layer. If Dn10 is too large, it may results in that compacted density of the second negative film layer is too low, the electrolytic solution diffuses and pass excessively, and the protective effect of the second negative film layer on the first negative film layer is lost.

Dn10 and Dv50 of the negative active material may be measured using a laser particle diameter analyzer (such as Malvern Master Size 3000) with reference to the standard GB/T 19077.1-2016. The physical definitions of Dn10 and Dv50 are as follows:

Dn10: a particle diameter when a cumulative number distribution percentage of the negative active material reaches 10%; and Dv50: a particle diameter when a cumulative volume distribution percentage of the negative active material reaches 50%.

In some implementation manners, a specific surface area of the artificial graphite is 0.5-1.5 m$^2$/g, optionally 0.6-1.0 m$^2$/g. The specific surface area of the artificial graphite in the second negative film layer is within a given range, which is beneficial to the improvement of initial efficiency and the cycle performance of the battery.

In the present application, the meaning of the specific surface area of the material is well-known in the art, and it can be measured using an instrument and a method known in the art. For example, with reference to the standard of GB/T 19587-2017, "Determination of the specific surface area of solids by gas adsorption using the BET method", a specific surface area of a material can be tested using a method of analysis and testing of the specific surface area by nitrogen adsorption, and obtained by calculation using the BET method (Brunauer Emmett Teller), where the analysis and testing of the specific surface area by nitrogen adsorption can be conducted by a Tri Star II 3020 Series specific surface and porosity analyzer from Micromeritics, USA.

In some implementation manners, initial coulombic efficiency of the artificial graphite is 94.5%-96.5%, optionally, 95.0%-96.0%.

The meaning of the initial coulombic efficiency of the artificial graphite is well-known in the art, and it can be measured in a manner known to persons skilled in the art. For example, artificial graphite, a conductive agent Super P, a binder SBR and dispersant CMC are dispersed in deionized water in a weight ratio of 94.5:1.5:2.5:1.5, and fully stirred and mixed to form a uniform slurry; and the slurry is coated on a current collector of copper foil, and the current collector is punched into a wafer with a diameter of 14 mm for later use after drying and cold pressing. A lithium sheet with a diameter of 14 mm is used as a counter electrode. EC, DEC and DMC with equal volumes are mixed uniformly, and then 1 mol/L LiPF$_6$ is uniformly dissolved in the foregoing organic solvent as an electrolytic solution. The foregoing artificial graphite wafer, separator and lithium sheet are stacked in sequence to obtain a battery cell, and the foregoing electrolytic solution is injected into the battery cell to complete the production of a button battery. The foregoing operations are performed in a glove box.

Under a constant temperature environment of 25° C., the button battery is discharged at a constant current at 0.1 C rate until a voltage is 0.005V, and then discharged at a constant voltage of 0.005V until a current is less than or equal to 0.01 mA, and after standing for 5 minutes, a discharge capacity at this time is denoted as d0. Then, the button battery is charged at a constant current at 0.1 C rate until the voltage is 2.0V, a charge capacity at this time is an initial garm capacity, denoted as c0, and initial coulombic efficiency ice0=c0/d0×100%.

In some implementation manners, the second negative active material may further include a silicon-based material. The silicon-based material may be selected from one or more of elemental silicon, a silicon-oxygen compound (such as a silicon oxide), a silicon-carbon composite, a silicon-nitrogen composite, a silicon alloy and a prelithiation silicon-oxygen compound, optionally, one or more of elemental silicon, a silicon-carbon composite, a silicon-oxygen compound and a prelithiation silicon-oxygen compound, or optionally, one or more of a prelithiation silicon-oxygen compound, a silicon-oxygen compound and a silicon-carbon composite.

In some implementation manners, when the second negative active material includes the silicon-based material, a mass proportion of the silicon-based material in the second negative film layer is less than or equal to 8%, for example, 1%-7%, or 2%-6%. The addition of a certain amount of the silicon-based material in the second negative active material can increase the content of silicon in the entire electrode sheet while ensuring synchronous expansion/contraction of the first negative film layer and the second negative film layer, reduce an interaction force between the film layers, and improve the problem of film stripping between the first negative film layer and the second negative film layer, thereby further improving the cycle performance of the battery.

In some implementation manners, when the second negative active material includes the silicon-based material, a weight ratio of the silicon material in the first negative film layer to the silicon material in the second negative film layer is 1:1-5:1, optionally, 1:1-3:1. The foregoing setting can further ensure synchronous expansion or contraction of the two layers and effectively reduce the separation of the two film layers, thereby further improving the cycle performance of the battery.

In some implementation manners, the second negative film layer includes a second conductive agent, and the second conductive agent includes one or more of superconducting carbon, acetylene black, Ketjen black, conductive carbon black, graphene, carbon dots, carbon nanotubes, carbon nanofibers and graphite, optionally, one or more of acetylene black, Ketjen black and conductive carbon black, or further optionally, one or more of acetylene black and conductive carbon black. Optionally, a mass proportion of the second conductive agent in the second negative film layer is 0.5%-10%, for example, 0.6%-5%, or 0.8%-2.5%.

In some implementation manners, the second negative film layer further includes a second binder, and the second binder may be selected from at least one of styrene-butadiene rubber (SBR), polyacrylic acid (PAA), polyacrylonitrile (PAN), polyacrylate sodium (PAAS), polyacrylamide (PAM), polyvinyl alcohol (PVA), sodium alginate (SA), polymethacrylic acid (PMAA) and carboxymethyl chitosan (CMCS), optionally, styrene-butadiene rubber (SBR) and polyacrylic acid (PAA). Optionally, a mass proportion of the second binder in the second negative film layer is 0.1%-6%, for example, 0.5%-4%, or 1%-3%.

In some implementation manners, the second negative film layer optionally includes another additive, such as dispersant (for example, carboxymethyl cellulose or sodium carboxymethyl cellulose (CMC-Na)). Optionally, a mass proportion of another additive in the second negative film layer is less than or equal to 6%, for example, 0.1%-5%, or 0.2%-4%.

In the present application, it should be understood that the sum of all components in the second negative film layer is 100% by mass.

In some implementation manners, a thickness of the second negative film layer is 25 μm-60 μm, optionally, 30 μm-50 μm. When the thickness of the second negative film layer is within a given range, the first negative film layer can be protected, and if the second negative film layer is too thick, the capacity utilization of the first negative film layer is easily affected.

In some implementation manners, a total thickness of one side of the negative electrode sheet is 28 μm-90 μm, optionally, 30 μm-75 μm. Here, persons skilled in the art can appreciate that the described "total thickness of one side" does not include the thickness of the current collector, but refers to the total thickness of the first negative film layer on one side of the current collector and the second negative film layer.

It should be noted that, the foregoing various parameter tests can be sampled and tested during the production of the battery, or can be sampled and tested from a produced secondary battery.

When the foregoing test samples are taken from a produced secondary battery, as an example, the sampling can be performed according to the following steps.

(1) Discharge treatment is performed on a secondary battery (for the sake of safety, the battery is generally in a state of full discharge); a negative electrode sheet is taken out after the battery is disassembled, and the negative electrode sheet is soaked using dimethyl carbonate (DMC) for a certain period of time (for example, for 2 hours-5 hours); and then the negative electrode sheet is taken out and dried at a certain temperature for a certain period of time (for example, at 40° C.-70° C. for 2 hours-5 hours), and the negative electrode sheet is taken out after drying. In this case, the foregoing parameters related to the negative active material layer (for example, the surface density, the compacted density, the thickness or the like, of the negative active material layer) can be sampled and tested in the dried negative electrode sheet.

(2) The dried negative electrode sheet in step (1) is baked at a certain temperature for a certain period of time (for example, at 200-500° C. for 1 hour-3 hours), any region in the baked negative electrode sheet is selected to sample a second negative active material first (powder is scraped with a blade for sampling), and the depth of the scraping powder does not exceed a boundary region between a first negative film layer and a second negative film layer; and the first negative active material is sampled in the same way. Since there may be a mutual fusion layer in the boundary region between the first negative film layer and the second negative film layer during the preparation of the negative active material layer (that is, the first negative active material and the second negative active material exist in the mutual fusion layer at the same time), for the accuracy of the test, when the first negative active material is sampled, the mutual fusion layer may be scraped off first, and then the powder of the first negative active material is scraped for sampling.

(3) The first negative active material and the second negative active material collected in step (2) are sieved respectively (for example, with 100-mesh-300-mesh sieves), and finally, a first negative active material sample and a second negative active material sample that can be used to test the foregoing material parameters (for example, material morphology, particle diameter, specific surface area) of the present application are obtained.

During the foregoing sampling, the position of the boundary region between the first negative film layer and the second negative film layer can be determined with the help of an optical microscope or a scanning electron microscope.

In the present application, the mass proportion of the silicon-based material in the negative film layer can be measured using an instrument and a method known in the art. For example, when a test sample is taken from a produced secondary battery, a silicon-based material is acquired through the foregoing steps, the silicon-based material is digested with reference to EPA-3052-1996, "Method of Microwave Acid Digestion of Silicates", and then a content of an element silicon is determined using an ICAP 7000 Series inductively coupled plasma optical emission spectrometer (ICP-OES) from Thermo Fisher Scientific, USA according to EPA 6010D-2014, "Inductively Coupled Plasma-Atomic Emission Spectrometry". The specific test method is as follows: a silicon-based material sample of 0.5 g is digested with 10 ml nitric acid with a mass fraction of 65% and 10 ml hydrofluoric acid with a mass fraction of 40% using an microwave, it is added to a 50 ml volumetric flask for constant volume after the digestion, then a content of an element silicon is determined using an ICAP 7000 Series ICP-OES, and a mass ratio of the silicon-based material is calculated according to the content of the element silicon.

In the present application, the mass proportions of the binder and the dispersant in the negative film layer can be simultaneously measured using an instrument and a method known in the art. For example, when a test sample is taken from a produced secondary battery, a powder material is acquired through the above steps, and mass ratios of a binder and dispersant are tested through thermogravimetry (a thermogravimetric analyzer may be used for test equipment).

In the present application, the mass proportion of the conductive agent in the negative film layer can be measured using an instrument and a method known in the art. For example, when a test sample is taken from a produced secondary battery, a powder material is acquired through the above steps, and mass ratios of a silicon-based material, a binder and dispersant are tested through the method given above; and the mass ratio of a conductive agent=the mass ratio of a first negative film layer–the mass ratio of the silicon-based material–the mass ratio of the binder–the mass ratio of the dispersant.

In addition, it should be noted that, the parameters of the first negative film layer and the second negative film layer given in the present application, such as the thickness of the first negative film layer, the thickness of the second negative film layer, or the surface density and compacted density thereof, all refer to the parameter ranges of a single-sided film layer of the negative electrode sheet. When two surfaces of the negative electrode current collector each are provided with the first negative film layer and the second negative film layer, parameters of the first negative film layer or the second negative film layer on either surface satisfy the present application, that is, they are considered to fall within the scope of protection of the present application. In addition, the ranges of the thicknesses, surface density and the like, of the negative active material layer of the present application all refer to parameters of the film layer that are compacted by cold pressing and used to assemble the battery.

In some implementation manners, for example, the negative electrode sheet may be prepared by the following means: first dispersing the components in the first negative film layer in a solvent (such as deionized water) to form a negative electrode slurry 1, and dispersing the components in the second negative film layer in a solvent (such as deionized water) to form a negative electrode slurry 2; extruding the negative electrode slurry 1 and the negative electrode slurry 2 through a double-chamber coating device, so that the negative electrode slurry 1 is coated on a current collector to form a first negative film layer, and the negative electrode slurry 2 is coated on the first negative film layer to form a second negative film layer; and finally, obtaining a negative electrode sheet after processes of drying, cold pressing and the like.

[Positive Electrode Sheet]

A positive electrode sheet generally includes a positive electrode current collector and a positive film layer provided on at least one surface of the positive electrode current collector, and the positive film layer includes a positive active material.

As an example, the positive electrode current collector has two surfaces opposite in its own thickness direction, and the positive film layer is provided on either or both of the two opposite surfaces of the positive electrode current collector.

In some implementation manners, the positive electrode current collector may be metal foil or a composite current collector. For example, as the metal foil, aluminum foil may be used. The composite current collector may include a polymer material base layer and a metal layer formed on at least one surface of the polymer material base layer. The composite current collector may be formed by synthesizing a metal material (aluminum, aluminum alloy, nickel, nickel alloy, titanium, titanium alloy, silver and silver alloy, or the like) on a polymer material substrate (such as a substrate of polypropylene (PP), polyethylene glycol terephthalate (PET), polybutylene terephthalate (PBT), polystyrene (PS), polyethylene (PE), or the like).

In some implementation manners, the positive active material may be a positive active material for a battery known in the art. As an example, the positive active material may include at least one of the following materials: a lithium-containing phosphate of an olivine structure, a lithium transition metal oxide, and their respective modified compounds. However, the present application is not limited to these materials, and other conventional materials that may be used as the positive active material of the battery may also be used. These positive active materials may be used alone, or two or more types may be used in combination. Examples of the lithium transition metal oxide may include, but are not limited to, at least one of a lithium cobalt oxide (such as $LiCoO_2$), a lithium nickel oxide (such as $LiNiO_2$), a lithium manganese oxide (such as $LiMnO_2$, $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (or referred to as $NCM_{333}$ for short), $LiNi_{0.5}Co_{0.2}Mn_{0.3}O_2$ (or referred to as $NCM_{523}$ for short), $LiNi_{0.5}Co_{0.25}Mn_{0.25}O_2$ (or referred to as $NCM_{211}$ for short), $LiNi_{0.6}Co_{0.2}Mn_{0.2}O_2$ (or referred to as $NCM_{622}$ for short), $LiNi_{0.8}Co_{0.1}Mn_{0.1}O_2$ (or referred to as $NCM_{811}$ for short), a lithium nickel cobalt aluminum oxide (such as $LiNi_{0.85}Co_{0.15}Al_{0.05}O_2$), their modified compounds, and the like. Examples of the lithium-containing phosphate of the olivine structure may include, but are not limited to, at least one of lithium iron phosphate (such as $LiFePO_4$ (or referred to as LFP for short)), a composite of lithium iron phosphate and carbon, lithium manganese phosphate (such as $LiMnPO_4$), a composite of lithium manganese phosphate and carbon, lithium manganese iron phosphate, and a composite of lithium manganese iron phosphate and carbon.

In some implementation manners, the positive film layer further optionally includes a binder. As an example, the binder may include at least one of a polyvinylidene fluoride (PVDF), a polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and fluorine-containing acrylate resin.

In some implementation manners, the positive film layer further optionally includes a conductive agent. As an example, the conductive agent may include at least one of superconducting carbon, acetylene black, carbon black, Ketjen black, carbon dots, carbon nanotubes, graphene, and carbon nanofibers.

In some implementation manners, the positive electrode sheet may be prepared by the following means: dispersing the foregoing components for preparing a positive electrode sheet, such as the positive active material, the conductive agent, the binder and any other components, in a solvent (such as N-methylpyrrolidone) to form a positive electrode slurry; and coating the positive electrode slurry on a positive electrode current collector, and obtaining the positive electrode sheet after processes of drying, cold pressing, and the like.

[Electrolyte]

An electrolyte plays the role of conducting ions between a positive electrode sheet and a negative electrode sheet. The type of the electrolyte is not specifically limited in the present application, and can be selected according to needs. For example, the electrolyte may be liquid, gel or all solid.

In some implementation manners, the electrolyte is liquid and includes an electrolyte salt and a solvent.

In some implementation manners, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimidate, lithium trifluoromethanesulfonate, lithium difluorophosphate, lithium difluorooxalateborate, lithium bisoxalateborate, lithium difluorobisoxalate phosphate and lithium tetrafluorooxalate phosphate.

In some implementation manners, the solvent may be selected from at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and diethyl sulfone.

In some implementation manners, the electrolytic solution further optionally includes an additive. For example, the additive may include a negative electrode film-forming additive, or a positive electrode film-forming additive, or may further include an additive that can improve specific performance of the battery, such as, an additive for improving overcharge performance of the battery, or an additive for improving high-temperature performance or low-temperature performance of the battery.

[Separator]

In some implementation manners, the secondary battery further includes a separator. The type of the separator is not particularly limited in the present application, and any well-known porous-structure separator with good chemical stability and mechanical stability can be selected.

In some implementation manners, the material of the separator may be selected from at least one of glass fiber, nonwoven fabric, polyethylene, polypropylene and polyvinylidene fluoride. The separator may be a single-layered thin film or a multi-layered composite thin film, which is not particularly limited. When the separator is a multi-layered composite thin film, the material of each layer can be the same or different, which is not particularly limited.

In some implementation manners, the positive electrode sheet, the negative electrode sheet and the separator may be subject to a winding process or a lamination process, to obtain an electrode assembly.

In some implementation manners, the secondary battery may include an outer package. The outer package may be used to package the foregoing electrode assembly and electrolyte.

In some implementation manners, the outer package of the secondary battery may be a hard shell such as a hard plastic shell, an aluminum shell, or a steel shell. The outer package of the secondary battery may be a soft package, such as a bag-type soft package. A material of the soft package may be plastic, for example, polypropylene, polybutylene terephthalate, polybutylene succinate.

A second aspect of the present application further involves a power consumption apparatus, which includes the secondary battery in the first aspect of the present application.

Figure 4:
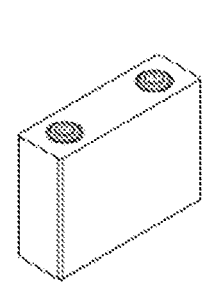
FIG. 4 is a schematic diagram of a secondary battery according to an implementation manner of the present application.

The present application has no particular limitation on the shape of the secondary battery, which may be a cylinder, a square, or any other shape. For example, FIG. 4 is a secondary battery 5 in a square structure as an example.

Figure 5:
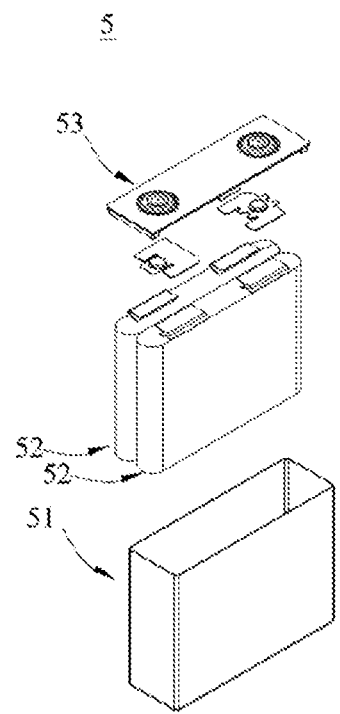
FIG. 5 is an exploded view of the secondary battery according to the implementation manner of the present application shown in FIG. 4.

In some implementation manners, with reference to FIG. 5, the outer package may include a housing 51 and a cover plate 53. The housing 51 may include a bottom plate and side plates connected to the bottom plate. The bottom plate and the side plates are enclosed to form an accommodating cavity. The housing 51 has an opening that is in communication with the accommodating cavity, and the cover plate 53 can cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery 5 may be one or more, which can be selected by persons skilled in the art according to specific actual needs.

In some implementation manners, secondary batteries may be assembled into a battery module, the number of secondary batteries included in the battery module may be one or more, and the specific number may be selected by persons skilled in the art according to application and capacity of the battery module.

Figure 6:
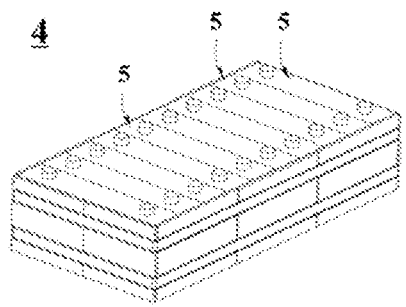
FIG. 6 is a schematic diagram of a battery module according to an implementation manner of the present application.

FIG. 6 is a battery module 4 as an example. With reference to FIG. 6, in the battery module 4, a plurality of secondary batteries 5 may be sequentially arranged along a length direction of the battery module 4. Certainly, they may be arranged in any other manner. Further, the plurality of secondary batteries 5 may be fixed with fasteners.

Optionally, the battery module 4 may further include a shell with an accommodating space, and the plurality of secondary batteries 5 are accommodated in the accommodating space.

In some implementation manners, the foregoing battery modules may be further assembled into a battery pack, and the number of battery modules included in the battery pack may be one or more, and the specific number may be selected by persons skilled in the art according to application and capacity of the battery pack.

Figure 7:
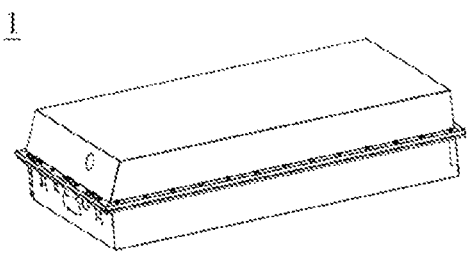
FIG. 7 is a schematic diagram of a battery pack according to an implementation manner of the present application.
Figure 8:
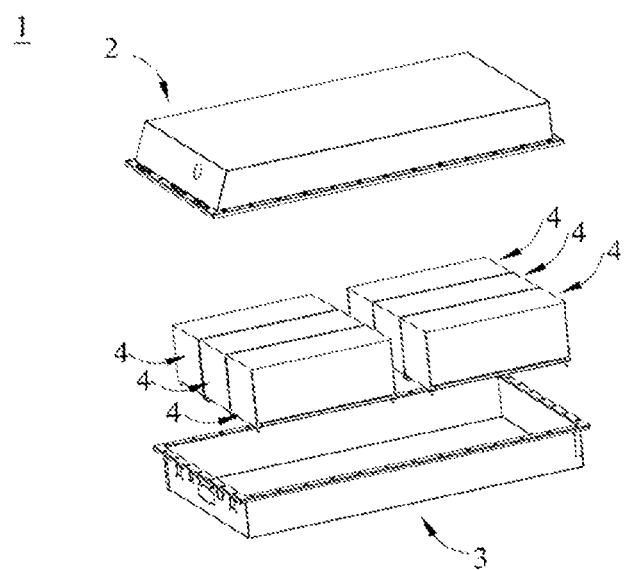
FIG. 8 is an exploded view of the battery pack according to the implementation manner of the present application shown in FIG. 7.

FIG. 7 and FIG. 8 are a battery pack 1 as an example. With reference to FIG. 7 and FIG. 8, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

In addition, the present application further provides a power consumption apparatus including at least one of the secondary battery, the battery module, or the battery pack provided in the present application. The secondary battery, the battery module, or the battery pack can be used as a power source of the power consumption apparatus, or as an energy storage unit of the power consumption apparatus. The power consumption apparatus may include a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf cart, or an electric truck), an electric train, a ship and satellite, an energy storage system, and the like, but is not limited thereto.

As the power consumption apparatus, a secondary battery, a battery module, or a battery pack may be selected according to usage requirements.

Figure 9:
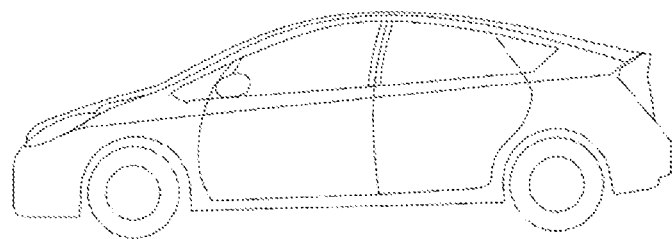
FIG. 9 is a schematic diagram of a power consumption apparatus in which a secondary battery is used as a power source according to an implementation manner of the present application.

FIG. 9 is a power consumption apparatus as an example. The power consumption apparatus is a full electric vehicle, a hybrid electric vehicle, a plug-in hybrid electric vehicle, or the like. To meet a requirement of the power consumption apparatus for high power and high energy density of a secondary battery, a battery pack or a battery module may be used.

EMBODIMENTS

Embodiments will be described hereinafter. The embodiments described below are exemplary and merely used to explain the present application, and may not be understood as limitation to the present application. Where specific techniques or conditions are not specified in the embodiments, they are performed according to techniques or conditions described in the literature in the art or according to product specifications. The reagents or instruments used without specifying the manufacturer are conventional products that can be obtained from the market.

Production of Secondary Battery

Embodiment 1

1. Preparation of positive electrode sheet: a positive active material $LiNi_{0.8}Co_{0.1}Mn_{0.1}O_2$ ($NCM_{811}$), a binder polyvinylidene fluoride (PVDF) and a conductive agent acetylene black were dissolved in a solvent N-methylpyrrolidone (NMP) in a mass ratio of 97%:1.5%:1.5%, and fully stirred and mixed uniformly to obtain a positive electrode slurry; and the positive electrode slurry was evenly coated on a positive electrode current collector of copper foil, and a positive electrode sheet was obtained after drying, cold pressing and slitting.

2. Preparation of negative electrode sheet:

Preparation of negative electrode slurry 1: a silicon oxide, a binder styrene-butadiene rubber (SBR), a binder polyacrylic acid (PAA), dispersant (CMC-Na) and conductive carbon black (Super-P, SP), carbon nanotubes (CNTs) were fully stirred and mixed in an appropriate amount of deionized water in a weight ratio of 40%:10%:8%:17%:24.7%:0.3%, to obtain a negative electrode slurry 1, where a volume average particle diameter Dv50 of the silicon oxide was 6.8 μm;

Preparation of negative electrode slurry 2: artificial graphite, a silicon oxide, a binder styrene-butadiene rubber, polyacrylic acid, dispersant (CMC-Na) and conductive carbon black (Super-P, SP) were fully stirred and mixed in an appropriate amount of deionized water in a weight ratio of 90%:6%:1%:1.5%:0.5%:1%, to obtain a negative electrode slurry 2, where a volume average particle diameter Dv50 of the artificial graphite was 14.7 μm, a specific surface area BET was 0.69 m²/g, Dn10 was 2.8 μm, a discharge capacity at 0.1 C and 0.05-2.0V was 357.8 mAh/g, and initial coulombic efficiency was 95.9%.

Preparation of negative electrode sheet: the negative electrode slurry 1 and the negative electrode slurry 2 were simultaneously extruded through a double-chamber coating device. The negative electrode slurry 1 was coated on a negative electrode current collector to form a first negative film layer, and the negative electrode slurry 2 was coated on the first negative film layer to form a second negative film layer. Finally, a negative electrode sheet was obtained after drying, cold pressing and slitting. A thickness of the first negative film layer was 12.5 μm, surface density of the first negative film layer was 1.95 mg/cm², a thickness of the second negative film layer was 48.5 μm, and surface density of the second negative film layer was 6.49 mg/cm².

3. Separator: a polypropylene film was used.

4. Preparation of electrolytic solution: ethylene carbonate (EC), ethyl methyl carbonate (EMC) and diethyl carbonate (DEC) were mixed in a volume ratio of 1:1:1, and then $LiPF_6$ was uniformly dissolved in the above solution to obtain an electrolytic solution. In this electrolytic solution, a concentration of $LiPF_6$ was 1 mol/L.

5. Preparation of secondary battery: the foregoing positive electrode sheet, separator, and negative electrode sheet were stacked and wound in order to obtain an electrode assembly; the electrode assembly was placed into an outer package, the above-prepared electrolytic solution was added, and a secondary battery was obtained after processes of packaging, standing, chemical conversion, aging and the like.

Comparative Example 1

The preparation methods in Comparative Example 1 is similar to that in Embodiment 1 in Table 1, and the difference is: a negative electrode slurry 1 and a negative electrode slurry 2 were both prepared by fully stirring and mixing artificial graphite, a silicon oxide, a binder styrene-butadiene rubber, polyacrylic acid, a thickener (CMC-Na) and conductive carbon black (Super-P, SP) in an appropriate amount of deionized water in a weight ratio of 80%:16%:1%:1.5%:0.5%:1% (where the content of all silicon in the prepared negative film layer was the same as that in Embodiment 8), where a volume average particle diameter Dv50 of the artificial graphite was 14.7 μm, a specific surface area BET was 0.69 m²/g, Dn10 is 2.8 μm, a discharge capacity at 0.1 C and 0.05-2.0V was 357.8 mAh/g, and initial coulombic efficiency was 95.9%.

Battery Test (1) Gram Capacity Utilization at 0.8V of a Half Button Battery and its Initial Coulombic Efficiency The test method is as follows: a negative electrode sheet prepared in the foregoing each embodiment and comparative example was given, and die-cut into a wafer sample with a diameter of 14 mm for use. A lithium sheet with a diameter of 14 mm was used as a counter electrode. EC, DEC and DMC with equal volumes were mixed uniformly, and then 1 mol/L $LiPF_6$ was uniformly dissolved in the foregoing organic solvent as an electrolytic solution. The foregoing wafer sample, separator and lithium sheet were stacked in sequence to obtain a battery cell, and the foregoing electrolytic solution was injected into the battery cell to complete the production of a button battery. The foregoing operations were performed in a glove box. Under a constant temperature environment of 25° C., the button battery was discharged at a constant current at 0.1 C rate until a voltage was 0.005V, and then discharged at a constant voltage of 0.005V until a current was less than or equal to 0.01 mA, and after standing for 5 minutes, a discharge capacity at this time was denoted as d0. Then, the button battery is charged at a constant current at 0.1 C rate until the voltage was 0.8V, a charge capacity at this time was an initial gram capacity, denoted as C0.8V, and initial coulombic efficiency at 0.8V is iceC0.8V=C0.8V/d0×100%.

(2) Cycle Performance Test of Secondary Battery at 45° C.

Under a constant temperature environment of 45° C., a secondary battery in the foregoing each embodiment and comparative example was charged at a constant current at 1 C rate until a voltage was 4.25V, and then charged at a constant voltage of 4.25V until a current was less than or equal to 0.05 mA, and after standing for 5 minutes, the secondary battery was discharged at a constant current at 1 C rate until the voltage was 2.5V, then standing for 5 minutes, which was a cyclic charge-discharge process; and a discharge capacity in this case was denoted as a discharge capacity of the secondary battery for the first cycle. The secondary battery was tested for 300 cycles of charge and discharge according to the foregoing method, and a discharge capacity for the $300^{th}$ cycle was recorded.

A capacity retention rate CR45° C. (%) of the secondary battery at 45° C. after 300 cycles=(the discharge capacity for the $300^{th}$ cycle/the discharge capacity for the first cycle)×100%.

(3) Electrode Sheet Cycle Expansion Performance Test of Secondary Battery at 45° C.

An electrode sheet thickness of a negative electrode sheet of a secondary battery when a cold pressing process was completed was recorded as h0. According to the foregoing cycle performance test method of the secondary battery at 45° C., the secondary battery was cycled for 300 cls and charged at a constant current at 1 C rate until a voltage was 4.25V, and charged at a constant voltage of 4.25V until a current was less than or equal to 0.05 mA, then standing for 5 minutes. A cycled battery cell was disassembled in a drying room, the thickness of the negative electrode sheet after 300 cls cycles was denoted as h300, and a cycle expansion rate Δh300(%) of the secondary battery for 300 cls of the electrode sheet at 45° C.=(h300−h0)/h0*100%.

The preparation methods of the secondary battery in Embodiments 2-21 and Comparative Example 2-3 are similar to those in Embodiment 1, but key parameters for preparing a negative electrode sheet are adjusted, as shown in Table 1 for details.

TABLE 1

Key parameters for preparing a first negative film layer of a negative electrode sheet

| Sequence number | Mass proportion of silicon-based material in first negative film layer (%) | Type of first conductive agent | Mass proportion of first conductive agent in first negative film layer (%) | Type of first binder | Mass proportion of first binder in first negative film layer (%) | Mass proportion of dispersant CMC-Na (%) | Thickness of first negative film layer (μm) | Gram capacity utilization at 0.8 V (mAh/g) | 45° C.-300 cls cycle capacity retention rate CR45° C. (%) | 45° C.-300 cls cycle expansion rate Δh300 (%) |
|---|---|---|---|---|---|---|---|---|---|---|
| Embodiment 1 | 40 | SP + CNT | 24.7 + 0.3 | SBR + PAA | 10 + 8 | 17 | 12.5 | 438.2 | 92.5 | 38.1 |
| Embodiment 2 | 40 | SP + CNT | 27.7 + 0.3 | SBR + PAA | 10 + 8 | 14 | 12.5 | 439.1 | 92.7 | 37.3 |
| Embodiment 3 | 40 | SP + CNT | 34.7 + 0.3 | SBR + PAA | 10 + 8 | 7 | 12.5 | 440.3 | 93.3 | 36.6 |
| Embodiment 4 | 40 | SP + CNT | 39.7 + 0.3 | SBR + PAA | 10 + 8 | 2 | 12.5 | 441.7 | 93.9 | 36.1 |
| Embodiment 5 | 45 | SP + CNT | 24.7 + 0.3 | SBR + PAA | 10 + 9 | 11 | 12.5 | 448.2 | 92.5 | 38.4 |
| Embodiment 6 | 45 | SP + CNT | 27.7 + 0.3 | SBR + PAA | 10 + 9 | 8 | 12.5 | 449.4 | 93.2 | 37.9 |
| Embodiment 7 | 45 | SP + CNT | 34.7 + 0.3 | SBR + PAA | 10 + 9 | 1 | 12.5 | 451.1 | 93.5 | 37.5 |
| Embodiment 8 | 50 | SP + CNT | 24.7 + 0.3 | SBR + PAA | 10 + 10 | 5 | 12.5 | 457.1 | 92.3 | 38.7 |
| Embodiment 9 | 50 | SP + CNT | 27.7 + 0.3 | SBR + PAA | 10 + 10 | 2 | 12.5 | 460.8 | 92.6 | 38.1 |
| Embodiment 10 | 50 | SP + CNT | 24.7 + 0.3 | SBR + PAA | 10 + 10 | 5 | 20.2 | 525.4 | 75.4 | 53.5 |
| Embodiment 11 | 50 | SP + CNT | 24.7 + 0.3 | SBR + PAA | 10 + 10 | 5 | 15 | 483.7 | 88.7 | 45.1 |
| Embodiment 12 | 50 | SP + CNT | 24.7 + 0.3 | SBR + PAA | 10 + 10 | 5 | 13 | 450.3 | 92.5 | 38.3 |
| Embodiment 13 | 50 | SP + CNT | 24.7 + 0.3 | SBR + PAA | 10 + 10 | 5 | 9.8 | 432.5 | 93.1 | 35.5 |
| Embodiment 14 | 50 | SP + CNT | 24.7 + 0.3 | SBR + PAA | 10 + 10 | 5 | 5.9 | 393.8 | 93.7 | 32.6 |
| Embodiment 15 | 50 | SP + CNT | 24.7 + 0.3 | SBR + PAA | 10 + 10 | 5 | 4.1 | 375.2 | 94.3 | 31.8 |
| Embodiment 16 | 50 | SP + artificial graphite with 10 μm Dv50 + CNT | 20.7 + 8 + 0.3 | SBR + PAA | 10 + 10 | 1 | 12.5 | 461.2 | 93.5 | 40.3 |

TABLE 1-continued

Key parameters for preparing a first negative film layer of a negative electrode sheet

| | First negative film layer | | | | | | | | Battery performance | | |
|---|---|---|---|---|---|---|---|---|---|---|---|
| Sequence number | Mass proportion of silicon-based material in first negative film layer (%) | Type of first conductive agent | Mass proportion of first conductive agent in first negative film layer (%) | Type of first binder | Mass proportion of first binder in first negative film layer (%) | Mass proportion of dispersant CMC-Na (%) | Thickness of first negative film layer (μm) | Gram capacity utilization at 0.8 V (mAh/g) | 45° C.-300 cls cycle capacity retention rate CR45° C. (%) | 45° C.-300 cls cycle expansion rate Δh300 (%) |
| Embodiment 17 | 50 | SP + artificial graphite with 8 μm Dv50 + CNT | 20.7 + 8 + 0.3 | SBR + PAA | 10 + 10 | 1 | 12.5 | 461.8 | 93.3 | 38.9 |
| Embodiment 18 | 50 | SP + artificial graphite with 5 μm Dv50 + CNT | 20.7 + 8 + 0.3 | SBR + PAA | 10 + 10 | 1 | 12.5 | 462.2 | 93.2 | 38.5 |
| Embodiment 19 | 50 | SP + artificial graphite with 3.2 μm Dv50 + CNT | 20.7 + 8 + 0.3 | SBR + PAA | 10 + 10 | 1 | 12.5 | 463.1 | 92.7 | 38.2 |
| Embodiment 20 | 50 | SP + artificial graphite with 2.0 μm Dv50 + CNT | 20.7 + 8 + 0.3 | SBR + PAA | 10 + 10 | 1 | 12.5 | 464.3 | 92.5 | 37.6 |
| Embodiment 21 | 50 | SP + artificial graphite with 1.5 μm Dv50 + CNT | 20.7 + 8 + 0.3 | SBR + PAA | 10 + 10 | 1 | 12.5 | 464.9 | 92.3 | 37.1 |
| Comparative Example 1 | Artificial graphite is directly mixed with a silicon material (compositions of the first negative film layer are the same as those of the second negative film layer, and the content of the silicon-based material is the same as that in Example 8 by adjusting the proportions of the artificial graphite and the silicon-based material, see Comparative Example 1 for the specific implementation manner) | | | | | | | 453.2 | 90.4 | 43.3 |
| Comparative Example 2 | 58.5 | SP + CNT | 10.3 + 2.0 | SBR | 14.6 | 14.6 | 12.5 | 412.5 | 81.9 | 46.8 |
| Comparative Example 3 | 50 | SP + CNT | 14.7 + 0.3 | SBR + PAA | 10 + 10 | 1 | 15 | 431.5 | 83.5 | 45.4 |

According to the above results, it can be seen that, in Embodiments 1-9, with the increase of the proportion of the silicon material in the first negative film layer, the gram capacity utilization at 0.8V of the negative electrode sheet is significantly improved, and the 45° C.-300 cls cycle capacity retention rate and expansion rate are relatively good.

According to Embodiments 10-15, it can be seen that, with the increase of the thickness of the first negative film layer, the gram capacity utilization at 0.8V of the negative electrode sheet is significantly improved, the 45° C.-300 cls cycle capacity retention rate is significantly reduced, and the 45° C.-300 cls cycle expansion rate is significantly increased. Considering the performance of the battery, the thickness of the first negative film layer is preferably less than or equal to 15 μm, especially, the thickness of the first negative film layer is 5 μm-15 μm, for example, preferably 5.9 μm-13 μm.

According to Embodiments 16-21, it can be seen that, after SP is partially replaced with artificial graphite in the first negative film layer, the gram capacity utilization at 0.8V of the negative electrode sheet is slightly improved, and with the decrease of the particle diameter of the artificial graphite, the 45° C.-300 cls cycle capacity retention rate is reduced to a certain extent, but the 45° C.-300 cls cycle expansion rate is improved to a certain extent. Considering the performance of the battery, the particle diameter of artificial graphite is preferably less than or equal to 10 μm, especially, the particle diameter of artificial graphite is less than or equal to 8 μm, for example, preferably 2 μm-5 μm.

In Comparative Example 1, conventional mixing of artificial graphite with a high content of silicon is used, and the gram capacity utilization at 0.8V of the negative electrode sheet is slightly lower; and compared with Example 8 in which the proportion of silicon doped is the same, the 45° C.-300 cls cycle capacity retention rate is significantly reduced, and the 45° C.-300 cls cycle expansion rate is significantly increased. It can be seen that, according to the solutions of the present application, the cycle capacity retention rate and the cycle expansion rate can be effectively increased.

In Comparative Example 2, the content of SP in the first negative film layer is reduced, the content of CNT is increased, the gram capacity utilization at 0.8V of the negative electrode sheet is slightly lower, the 45° C.-300 cls cycle capacity retention rate is worse and the 45° C.-300 cls cycle expansion rate is larger. In addition, during the experiment, it was found that, the high content of CNT is easy to cause gelatination during stirring and pulping, and the cost of this solution is relatively high. The high SP solution of the present application can solve the above problem.

In Comparative Example 3, the content of the first conductive agent SP in the first negative film layer is reduced, which seriously affects the gram capacity utilization at 0.8V of the negative electrode sheet, and the 45° C.-300 cls cycle capacity retention rate is seriously deteriorated, and its cycle expansion rate is larger. It can be seen that the content of the first conductive agent SP is very important to the improvement of the capacity utilization and the cycle stability and the cycle expansion of the negative electrode sheet.

It should be noted that the present application is not limited to the foregoing implementation manners. The foregoing implementation manners are merely examples, and implementation manners having substantially the same constitution as the technical idea and exerting the same effects within the technical solution of the present application are all included within the technical scope of the present application. In addition, various modifications may be made to the implementation manners by persons skilled in the art without departing from the spirit and scope of the present application, and other implementation manners that are constructed by combining some of the constituent elements of the implementation manners are also included in the scope of the present application.

What is claimed is:

1. A secondary battery, comprising a negative electrode sheet, the negative electrode sheet comprising:
    a negative electrode current collector;
    a first negative film layer provided on at least one surface of the negative electrode current collector, the first negative film layer having a thickness from 5.9 μm to 13 μm; and
    a second negative film layer provided on a surface of the first negative film layer, the second negative film layer having a thickness from 25 μm to 60 μm; and wherein
    the first negative film layer comprises a first negative active material, a first binder, and a first conductive agent, the first conductive agent comprises conductive carbon black and carbon nanotubes, and the first negative active material comprises a silicon-based material;
    the second negative film layer comprises a second negative active material, a second conductive agent, and a second binder, the second negative active material comprises artificial graphite and a silicon-based material, a volume average particle diameter Dv50 of the artificial graphite is 10 μm to 20 μm, and a number average particle diameter Dn10 of the artificial graphite is 1 μm to 5 μm;
    the first negative film layer has a surface density from 0.649-2.922 mg/cm$^2$, and a ratio of surface density of the first negative film layer to surface density of the second negative film layer is less than or equal to 1:3; and
    a mass of the silicon-based material in the first negative film layer is 40%-50% of the weight of the first negative film layer, a mass of the first conductive agent in the first negative film layer is 25% to 40% of the first negative film layer, a weight ratio of the silicon material in the first negative film layer to the silicon material in the second negative film layer is 1:1-5:1, a mass of the conductive carbon black in the first negative film layer is greater than or equal to 20% of the weight of the first negative film layer, a mass of the carbon nanotubes in the first negative film layer is less than or equal to 1.2% of a total weight of the first conductive agent and less than or equal to 0.4% of a total weight of the first negative film layer, a mass of the second conductive agent in the second negative film layer is less than 10% of the weight of the second negative film layer, and a mass of the first binder in the first negative film layer is greater than or equal to 15% of the weight of the first negative film layer.

2. The secondary battery according to claim 1, wherein the first conductive agent further comprises one or more of superconducting carbon, acetylene black, Ketjen black, graphene, carbon dots, carbon nanotubes, carbon nanofibers and graphite.

3. The secondary battery according to claim 1, wherein the first conductive agent comprises graphite, and a volume average particle diameter Dv50 of the graphite is less than or equal to 8 μm.

4. The secondary battery according to claim 1, wherein the first conductive agent comprises graphite, and a mass proportion of the graphite in the first conductive agent is less than or equal to 10%.

5. The secondary battery according to claim 1, wherein a ratio of a thickness of the first negative film layer to a thickness of the second negative film layer is less than or equal to 1:2.

6. The secondary battery according to claim 1, wherein
    a specific surface area of the artificial graphite is 0.5 m$^2$/g-1.5 m$^2$/g; and
    initial coulombic efficiency of the artificial graphite is 94.5%-96.5%.

7. The secondary battery according to claim 1, wherein a mass proportion of the artificial graphite in the second negative active material is greater than or equal to 80%.

8. The secondary battery according to claim 1, wherein a mass proportion of the silicon-based material in the second negative film layer is less than or equal to 8%.

9. The secondary battery according to claim 1, wherein a total thickness of the first negative film layer and the second negative film layer is from 30 μm to 75 μm.

10. The secondary battery according to claim 1, wherein the second negative film layer further comprises a conductive carbon black having a content of 2.5% or less by weight.

11. The secondary battery according to claim 1, wherein the first negative active material of the first negative film layer consists of the silicon-based material.

12. The secondary battery according to claim 1, wherein the secondary battery according to claim 1, wherein a mass of the second binder in the second negative film layer is 0.1% to 6% of the weight of the second negative film layer.

13. A power consumption apparatus, comprising the secondary battery of claim 1.

* * * * *